(12) United States Patent
Schorn et al.

(10) Patent No.: US 8,905,187 B2
(45) Date of Patent: Dec. 9, 2014

(54) DEVICE AND METHOD FOR MANIPULATING THE EXHAUST OUTLET NOISE OF A MOTOR VEHICLE

(71) Applicants: Dr. Ing h.c. F. Porsche Aktiengesellschaft, Stuttgart (DE); TechnoFirst, Aubagne Cedex (FR)

(72) Inventors: Juergen Schorn, Rutesheim (DE); Christian Emile Marie Carme, Marseilles (FR); Daniel Joseph Maguire, Auburn, IN (US)

(73) Assignees: Dr. Ing. h.c. F. Porsche Aktiengesellschaft, Stuttgart (DE); Technofirst, Aubagne Cedex (FR)

( * ) Notice: Subject to any disclaimer, the term of this patent is extended or adjusted under 35 U.S.C. 154(b) by 0 days.

(21) Appl. No.: 14/021,496

(22) Filed: Sep. 9, 2013

(65) Prior Publication Data
US 2014/0069739 A1 Mar. 13, 2014

Related U.S. Application Data

(60) Provisional application No. 61/699,355, filed on Sep. 11, 2012.

(51) Int. Cl.
*F01N 13/08* (2010.01)
(52) U.S. Cl.
USPC .......................... 181/228; 181/227; 181/237
(58) Field of Classification Search
CPC .......................................................... F01N 1/02
USPC ......................................... 181/227, 228, 237
See application file for complete search history.

(56) References Cited

U.S. PATENT DOCUMENTS

| 5,655,367 | A | 8/1997 | Peube et al. |
| 6,598,390 | B2 * | 7/2003 | Chang .............................. 60/323 |
| 7,155,333 | B1 * | 12/2006 | Abram et al. .................. 701/111 |
| 7,401,592 | B2 | 7/2008 | Willats et al. |
| 7,434,570 | B2 * | 10/2008 | Hill ........................... 123/568.18 |
| 7,913,810 | B2 * | 3/2011 | Meneely et al. ............... 181/254 |
| 2004/0261404 | A1 * | 12/2004 | Vignassa et al. ................ 60/324 |
| 2005/0067219 | A1 * | 3/2005 | Albertson et al. ............ 181/240 |
| 2009/0319160 | A1 | 12/2009 | Callahan et al. |
| 2011/0079463 | A1 * | 4/2011 | Scheetz ......................... 181/250 |

FOREIGN PATENT DOCUMENTS

| DE | 102 48 607 A1 | 5/2004 |
| DE | 11 2006 002 343 T5 | 7/2008 |
| DE | 11 2008 000 844 T5 | 2/2010 |
| EP | 0 649 494 A1 | 4/1995 |
| EP | 1 982 055 B1 | 10/2008 |
| WO | WO 2004/036001 A1 | 4/2004 |

OTHER PUBLICATIONS

German Search Report issued in corresponding German Application No. 10 2012 017 902.2, mailed Mar. 8, 2013 with partial translation.

* cited by examiner

*Primary Examiner* — Forrest M Phillips
(74) *Attorney, Agent, or Firm* — RatnerPrestia

(57) ABSTRACT

A device for manipulating the exhaust outlet noise of a motor vehicle, having an exhaust flap which can be positioned in an exhaust pipe and which can be displaced in oscillatory fashion about an exhaust flap basic position in a defined angle range about the exhaust flap basic position in order to manipulate the exhaust outlet noise, wherein the exhaust flap basic position can be actively adjusted as a function of an engine rotational speed and/or an engine load, and wherein the angle range can be actively adjusted as a function of a frequency to be eliminated or attenuated, or a frequency to be generated or enhanced, of the exhaust outlet noise.

12 Claims, 1 Drawing Sheet

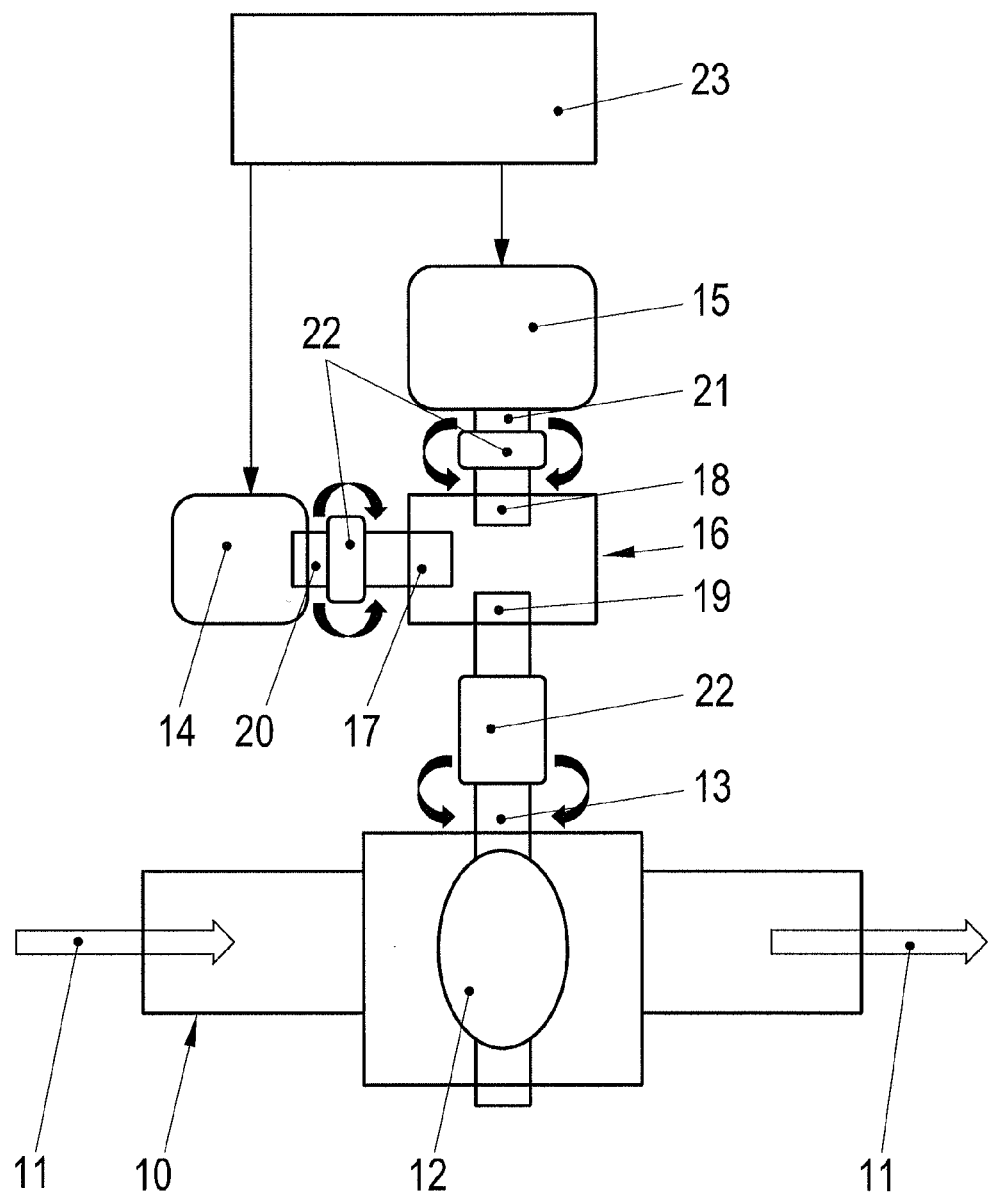

DEVICE AND METHOD FOR MANIPULATING THE EXHAUST OUTLET NOISE OF A MOTOR VEHICLE

CROSS-REFERENCE TO RELATED APPLICATIONS

This application claims priority to U.S. Provisional Patent Application No. 61/699,355, filed Sep. 11, 2012, which is incorporated by reference herein in its entirety.

FIELD OF THE INVENTION

The invention relates to a device and method for manipulating the exhaust outlet noise of a motor vehicle.

BACKGROUND OF THE INVENTION

It is known from EP 0 649 494 B1, incorporated by reference herein, to vary a sound level and/or a tone of an exhaust noise by means of a throttle flap positioned in an exhaust line.

It is also known from EP 1 982 055 B1, incorporated by reference herein, for a drive of a throttle flap positioned in the exhaust line to be activated by means of a signal generator in a targeted manner such that the throttle flap generates a desired frequency spectrum through additional sound generation.

SUMMARY OF THE INVENTION

With the devices and methods known from the prior art, it is already possible to a certain extent to manipulate an exhaust outlet noise of a motor vehicle. There is however demand for a device and a method for manipulating the exhaust outlet noise of a motor vehicle by means of which said manipulation is possible to a greater extent and with a greater degree of variety.

Taking this as a starting point, described herein is a device for manipulating the exhaust outlet noise of a motor vehicle and a corresponding method.

According to aspects of the invention, the device has an exhaust flap which can be positioned in an exhaust pipe and which can be displaced in oscillatory fashion about an exhaust flap basic position in a defined angle range about the exhaust flap basic position in order to manipulate the exhaust outlet noise, characterized in that the exhaust flap basic position can be actively adjusted as a function of an engine rotational speed and/or an engine load, and in that the angle range can be actively adjusted as a function of a frequency to be eliminated or attenuated, or a frequency to be generated or enhanced, of the exhaust outlet noise.

Within the context of the present invention, it is possible for firstly the exhaust flap basic position about which the exhaust flap can be driven in oscillatory fashion and secondly the angle range in which the exhaust flap is driven in oscillatory fashion about the exhaust flap basic position to be actively adjusted, wherein the exhaust flap basic position is adjusted as a function of the engine rotational speed of the internal combustion engine and/or as a function of the engine load of the internal combustion engine, and wherein the angle range is adjusted as a function of the frequency to be eliminated or attenuated, or the frequency to be generated or enhanced, of the exhaust outlet noise, that is to say as a function of the desired frequency spectrum of the exhaust outlet noise. In this way, the exhaust outlet noise can be varied in a desired direction to a large extent.

If the exhaust flap basic position can be actively adjusted as a function of the engine rotational speed, a relatively small gap between the exhaust flap and the exhaust pipe is set by means of the exhaust flap basic position at relatively low engine rotational speeds, whereas a relatively large gap between the exhaust flap and the exhaust pipe is set by means of the exhaust flap basic position at relatively high engine rotational speeds. This approach is advantageous if the exhaust flap basic position is actively adjusted exclusively as a function of the engine rotational speed.

If the exhaust flap basic position can be actively adjusted as a function of the engine load, a relatively small gap between the exhaust flap and the exhaust pipe is set by means of the exhaust flap basic position at relatively low engine loads, whereas a relatively large gap between the exhaust flap and the exhaust pipe is set by means of the exhaust flap basic position at relatively high engine loads. This approach is advantageous if the exhaust flap basic position is actively adjusted exclusively as a function of the engine load.

If the exhaust flap basic position can be actively adjusted as a function of the engine rotational speed and the engine load, a relatively small gap between the exhaust flap and the exhaust pipe is set by means of the exhaust flap basic position at relatively low engine rotational speeds and simultaneously relatively low engine loads. A relatively large gap between the exhaust flap and the exhaust pipe is set by means of the exhaust flap basic position at relatively high engine rotational speeds and simultaneously relatively high engine loads. A gap between the exhaust flap and the exhaust pipe which is larger than the relatively small gap and smaller than the relatively large gap is set by means of the exhaust flap basic position at relatively low engine rotational speeds and simultaneously relatively high engine loads or at relatively high engine rotational speeds and simultaneously relatively low engine loads. This approach is advantageous if the exhaust flap basic position is adjusted firstly as a function of the engine rotational speed and secondly as a function of the engine load.

The angle range about the exhaust flap basic position is actively set so as to be relatively small at high frequencies and so as to be relatively large at low frequencies. Said selection of the angle range for the oscillatory drive of the exhaust flap about the exhaust flap basic position is particularly preferable.

According to a further advantageous refinement of the invention, the device has a first drive, by means of which the exhaust flap basic position of the exhaust flap can be adjusted, a second drive by means of which the exhaust flap can be displaced in oscillatory fashion in the defined angle range about the exhaust flap basic position, and a gearing, wherein the first drive and the second drive engage on in each case one input shaft of the gearing and the exhaust flap engages on an output shaft of the gearing. It is preferable if, between a shaft of the first drive and a first input shaft of the gearing, between a shaft of the second drive and a second input shaft of the gearing, and between the output shaft of the gearing and a shaft of the exhaust flap, there is connected in each case one decoupling element which acts in the axial direction of the respective shafts. Said embodiment of the device according to aspects of the invention with two drives and with a gearing which is connected between the two drives and the exhaust flap is inexpensive and simple.

BRIEF DESCRIPTION OF THE DRAWING

Preferred refinements of the invention will emerge from the subclaims and from the following description. Exemplary embodiments of the invention will be explained in more detail on the basis of the drawing, without the invention being restricted to said exemplary embodiments. In the drawing:

FIG. 1 shows a schematic view of a device for manipulating the exhaust outlet noise of a motor vehicle.

DETAILED DESCRIPTION OF THE DRAWING

The present invention relates to a device for manipulating the exhaust outlet noise of a motor vehicle and to a corresponding method.

FIG. 1 shows an exhaust pipe 10 of a motor vehicle in highly schematic form, wherein the flow direction of the exhaust gas through the exhaust pipe 10 is visualized by arrows 11.

In the exhaust pipe 10 there is positioned an exhaust flap 12 which is displaceable in oscillatory fashion or dynamically about an exhaust flap basic position in a defined angle range about the exhaust flap basic position. The exhaust flap 12 is, as per FIG. 1, mounted on a shaft 13.

Within the context of the invention, the exhaust flap basic position of the exhaust flap 12, about which said exhaust flap is displaceable, can be actively adjusted as a function of an engine rotational speed and/or an engine load of an internal combustion engine of the motor vehicle. The angle range in which the exhaust flap 12 is displaceable about the exhaust flap basic position can be actively adjusted as a function of a frequency to be eliminated or attenuated, or a frequency to be generated or enhanced, of the exhaust outlet noise to be manipulated.

The exhaust flap basic position, which can be adjusted as a function of the engine rotational speed and/or the engine load, may also be referred to as a static exhaust flap basic position, because said exhaust flap basic position is constant as a function of the engine rotational speed and/or the engine load. The angle range in which the exhaust flap 12 is displaceable about said static exhaust flap basic position may also be referred to as a dynamic angle range, because said displacement is performed dynamically, or in oscillatory fashion, as a function of the frequency.

If the static exhaust flap basic position of the exhaust flap 12 can be actively adjusted as a function of the engine rotational speed of the internal combustion engine, a relatively small gap between the exhaust flap 12 and the exhaust pipe 10 is set by means of the static exhaust flap basic position at relatively low engine rotational speeds, whereas a relatively large gap between the exhaust flap 12 and the exhaust pipe 10 is set by means of the static exhaust flap basic position at relatively high engine rotational speeds. In a preferred embodiment, it is provided here that a static exhaust flap basic position of between 0° and 30° is actively set at relatively low engine rotational speeds between an idle engine rotational speed and 3000 revolutions per minute, and a static exhaust flap basic position of between 30° and 90° is actively set at relatively high engine rotational speeds between 3000 revolutions per minute and a maximum engine rotational speed.

If the static exhaust flap basic position can be or is actively adjusted as a function of the engine load, a relatively small gap between the exhaust flap 12 and the exhaust pipe 10 is set by means of the static exhaust flap basic position at relatively low engine loads, whereas a relatively large gap between the exhaust flap 12 and the exhaust pipe 10 is set by means of the static exhaust flap basic position at relatively high engine loads. In a preferred embodiment of the invention, it is provided in this context that a static exhaust flap basic position of between 0° and 30° is actively set at relatively low engine loads between 0% and 50% of a maximum engine load, and a static exhaust flap basic position of between 30° and 90° is actively set at relatively high engine loads between 50% and 100% of a maximum engine load.

In a further variant of the invention, it is provided that the exhaust flap basic position of the exhaust flap 12 can be actively adjusted as a function of the engine rotational speed and as a function of the engine load. A relatively small gap between the exhaust flap 12 and the exhaust pipe 10 is set by means of the exhaust flap basic position at relatively low engine rotational speeds and simultaneously relatively low engine loads. A relatively large gap between the exhaust flap 12 and the exhaust pipe 10 is set by means of the exhaust flap basic position at relatively high engine rotational speeds and simultaneously relatively high engine loads. A gap between the exhaust flap 12 and the exhaust pipe 10 which is larger than the relatively small gap and smaller than the relatively large gap is set by means of the exhaust flap basic position at relatively low engine rotational speeds and simultaneously relatively high engine loads or at relatively high engine rotational speeds and simultaneously relatively low engine loads. In a preferred embodiment of said refinement, it is provided that a static exhaust flap basic position of between 0° and 20° is actively set at relatively low engine rotational speeds between an idle engine rotational speed and 3000 revolutions per minute and at simultaneously relatively low engine loads between 0% and 50% of a maximum engine load. A static exhaust flap basic position of between 60° and 90° is actively set at relatively high engine rotational speeds between 3000 revolutions per minute and a maximum engine rotational speed and at simultaneously relatively high engine loads between 50% and 100% of a maximum engine load. A static exhaust flap basic position of the exhaust flap 12 of between 20° and 60° is actively set at relatively low engine rotational speeds between an idle engine rotational speed and 3000 revolutions per minute and at simultaneously relatively high engine loads between 50% and 100% of a maximum engine load and also at relatively high engine rotational speeds between 3000 revolutions per minute and a maximum engine rotational speed and at simultaneously relatively low engine loads between 0% and 50% of a maximum engine load.

The dynamic angle range in which the exhaust flap 12 oscillates about the static exhaust flap basic position is relatively small at relatively high frequencies to be eliminated or attenuated or at relatively high frequencies to generated or enhanced. The same is relatively large at relatively low frequencies to be eliminated or attenuated or at relatively low frequencies to generated or enhanced.

In one advantageous refinement, it is provided that the dynamic adjustment angle is ±5° about the exhaust flap basic position at relatively high frequencies between 150 Hz and 300 Hz, and that a dynamic adjustment angle of ±20° about the exhaust flap basic position is set at relatively low frequencies between 20 Hz and 150 Hz.

As already stated, both the static exhaust flap basic position and also the dynamic angle range or adjustment angle about the exhaust flap basic position can be actively adjusted, for which purpose, as per FIG. 1, the device according to aspects of the invention has a first drive 14 for actively adjusting the exhaust flap basic position of the exhaust flap 12 in the exhaust pipe 10 and a second drive 15 for the oscillatory displacement of the exhaust flap 12 in the defined angle range about the exhaust flap basic position. Between the two drives 14 and 15 and the exhaust flap 12 there is connected a gearing 16, wherein the first drive 14 engages on a first input shaft 17 of the gearing 16 and the second drive 15 engages on a second input shaft 18 of the gearing 16, whereas the exhaust flap 12 engages on an output shaft 19 of the gearing 16.

As per FIG. 1, between a shaft 20 of the first drive 14 and the first gearing input shaft 17, between a shaft 21 of the second drive 15 and the second gearing input shaft 18, and between the shaft 13 of the exhaust flap 12 and the output shaft 19 of the gearing 16, there is connected in each case one decoupling element 22 which acts in the axial direction of the respective shafts.

The decoupling elements 22 provide vibration decoupling in the axial direction, and for this purpose are designed to be relatively soft in the axial direction, wherein the decoupling elements 22 are designed to be relatively rigid in the circumferential direction in order to ensure a transmission of torque.

The device according to aspects of the invention furthermore comprises a control device 23 which performs the actuation of the two drives 14 and 15 in order to actively adjust both the static exhaust flap basic position and also the dynamic adjustment angle in the manner described above.

What is claimed:

1. A device for manipulating the exhaust outlet noise of a motor vehicle, having an exhaust flap which is configured to be positioned in an exhaust pipe and which is configured to be displaced in oscillatory fashion about an exhaust flap basic position in a defined angle range about the exhaust flap basic position in order to manipulate the exhaust outlet noise, wherein the exhaust flap basic position is configured to be actively adjusted as a function of an engine rotational speed and/or an engine load, and in that the angle range is configured to be actively adjusted as a function of a frequency to be eliminated or attenuated, or a frequency to be generated or enhanced, of the exhaust outlet noise, and wherein the device further composes a first drive, by which the exhaust flap basic position of the exhaust flap is adjusted, a second drive by which the exhaust flap is displaced in oscillatory fashion in the defined angle range about the exhaust flap basic position, and gearing having at least one input shaft and at least one output shaft, wherein the first drive and the second drive engage on, in each case, the at least one input shaft of the gearing and the exhaust flap engages on the at least one output shaft of the gearing.

2. The device as claimed in claim 1, wherein, when the exhaust flap basic position is actively adjusted as a function of the engine rotational speed, a relatively small gap between the exhaust flap and the exhaust pipe is set at relatively low engine rotational speeds, whereas a relatively large gap between the exhaust flap and the exhaust pipe is set at relatively high engine rotational speeds.

3. The device as claimed in claim 2, wherein, an exhaust flap basic position of between 0 degree and 30 degree is actively set at relatively low engine rotational speeds between an idle engine rotational speed and 3000 revolutions per minute, and an exhaust flap basic position of between 30 degree and 90 degree is actively set at relatively high engine rotational speeds between 3000 revolutions per minute and a maximum engine rotational speed.

4. The device as claimed in claim 1, wherein, when the exhaust flap basic position is actively adjusted as a function of the engine load, a relatively small gap between the exhaust flap and the exhaust pipe is set at relatively low engine loads, whereas a relatively large gap between the exhaust flap and the exhaust pipe is set at relatively high engine loads.

5. The device as claimed in claim 4, wherein, an exhaust flap basic position of between 0 degree and 30 degree is actively set at relatively low engine loads between 0% and 50% of a maximum engine load, and an exhaust flap basic position of between 30 degree and 90 degree is actively set at relatively high engine loads between 50% and 100% of a maximum engine load.

6. The device as claimed in claim 1, wherein, when the exhaust flap basic position is actively adjusted as a function of the engine rotational speed and the engine load, a relatively small gap between the exhaust flap and the exhaust pipe is set at relatively low engine rotational speeds and simultaneously relatively low engine loads, a relatively large gap between the exhaust flap and the exhaust pipe is set at relatively high engine rotational speeds and simultaneously relatively high engine loads, and a gap between the exhaust flap and the exhaust pipe which is larger than the relatively small gap and smaller than the relatively large gap is set at relatively low engine rotational speeds and simultaneously relatively high engine loads or at relatively high engine rotational speeds and simultaneously relatively low engine loads.

7. The device as claimed in claim 6, wherein, an exhaust flap basic position of between 0 degree and 20 degree is actively set at relatively low engine rotational speeds between an idle engine rotational speed and 3000 revolutions per minute and at simultaneously relatively low engine loads between 0% and 50% of a maximum engine load, in that an exhaust flap basic position of between 60 degree and 90 degree is actively set at relatively high engine rotational speeds between 3000 revolutions per minute and a maximum engine rotational speed and at simultaneously relatively high engine loads between 50% and 100% of a maximum engine load, and in that an exhaust flap basic position of between 20 degree and 60 degree is actively set at relatively low engine rotational speeds between an idle engine rotational speed and 3000 revolutions per minute and at simultaneously relatively high engine loads between 50% and 100% of a maximum engine load and also at relatively high engine rotational speeds between 3000 revolutions per minute and a maximum engine rotational speed and at simultaneously relatively low engine loads between 0% and 50% of a maximum engine load.

8. The device as claimed in claim 1, wherein, the angle range about the exhaust flap basic position is actively set so as to be relatively small at high frequencies and so as to be relatively large at low frequencies.

9. The device as claimed in claim 8, wherein, an adjustment angle of +/−5 degree about the exhaust flap basic position is set at high frequencies between 150 Hz and 300 Hz and an adjustment angle of +/−20 degree about the exhaust flap basic position is set at low frequencies between 20 Hz and 150 Hz.

10. The device as claimed in claim 1, wherein, between a shaft of the first drive and a first input shaft of the gearing, between a shaft of the second drive and a second input shaft of the gearing, and between the output shaft of the gearing and a shaft of the exhaust flap, there is connected in each case one decoupling element which acts in the axial direction of the respective shafts.

11. The device as claimed in claim 10, wherein, the decoupling elements are designed to be relatively soft in the axial direction for vibration decoupling and relatively rigid in the circumferential direction for a transmission of torque.

12. The device as claimed in claim 1, wherein a control device actuates the two drives as a function of the engine rotational speed and/or the engine load and as a function of the frequency to be eliminated or to be generated.

* * * * *